United States Patent [19]

Liedloff et al.

[11] Patent Number: 4,734,462

[45] Date of Patent: Mar. 29, 1988

[54] PREPARATION OF BLOCK POLYURETHANE-AMIDES

[75] Inventors: Hanns-Jörg Liedloff, Domat/Ems; Hans-Joachim Schultze, Chur, both of Switzerland

[73] Assignee: Ems-Inventa AG, Switzerland

[21] Appl. No.: 22,289

[22] Filed: Mar. 5, 1987

[30] Foreign Application Priority Data

Mar. 20, 1986 [CH] Switzerland .................. 01122/86

[51] Int. Cl.⁴ .............................................. C08G 69/48
[52] U.S. Cl. ................................... 525/424; 525/420; 525/420.5; 525/454
[58] Field of Search ............ 525/424, 420, 454, 420.5

[56] References Cited

U.S. PATENT DOCUMENTS 3,428,710  2/1969  Daumiller et al. .................. 525/424
3,718,713  2/1973  Tanaka et al. ...................... 525/424
3,892,820  7/1975  Goto et al. ......................... 525/424
4,578,447  3/1986  Humphrey .......................... 525/424

FOREIGN PATENT DOCUMENTS 7138981 11/1971  Japan ................................. 525/424

Primary Examiner—Harold D. Anderson
Attorney, Agent, or Firm—Jordan B. Bierman

[57] ABSTRACT

A method for the preparation of block polyurethane amides in a melt by the reaction of
(a) a linear polyamide having terminal carboxylic acid ester groups and which melts at not more than 210° C.; and
(b) a polyurethane having hydroxyl groups at its chain ends;
at a temperature of 160° C. to 240° C., and in the presence of a trans-esterification accelerator.

27 Claims, No Drawings

PREPARATION OF BLOCK POLYURETHANE-AMIDES

This Application claims the priority of Swiss No. 11,122/86, filed Mar. 20, 1986.

The present invention is directed to a process for the preparation of thermoplastic block polyurethane amides having polyurethane and polyamide portions which are connected by ester linkages. The invention also encompasses the use of such compounds in the formation of injection-molded and extruded bodies, as well as for hot melt adhesives.

BACKGROUND OF THE INVENTION

Since their discovery, polyamides have become a class of materials of increasing importance. They are now available in a multitude of modified forms and, in particular, as mixtures with various other polymers for a variety of uses. In order to enhance their usefulness, attempts have been made to integrate the advantageous properties of polyamides with those of polyurethanes by simple physical mixture of the respective polymers in the molten state. However, mixtures of this type generally exhibit poorer properties than the individual components because of the limited compatibility of the polyamides with polyurethanes.

In theory, another way in which to combine the properties of polyamides and polyurethanes in one product is by the construction of suitable block polymers in which alternating polyurethane and polyamide segments are connected with each other by chemical bonds. DE-AS-1,224,031 (BASF) gives examples in which polyether-polyol groups can be linked with low molecular polyamides carrying carboxyl or amino end groups via urethane and amide or urea groups. To this end, the polyether-polyol is first reacted with a molar excess (up to 2 mol) of diisocyanates and the isocyanate-modified polyether-polyol is reacted with the carboxyl-amino groups of the polyamides.

These products can be used, in small amounts, as anti-static additives for thermoplasts, especially polyamides. They are not suitable for thersoplastic processing; e.g. for injection-molded and extruded bodies. In the reaction of diisocyanates with polyamides which carry amino, hydroxyl or carboxyl terminal groups, there are usually side-reactions which very quickly lead to partial cross-linking of the resultant polymers of the type described in DE-AS-1,224,031, especially if these polymers are prepared at high temperatures in the melt. The cross-linking reactions which take place, e.g. as a result of the reaction of isocyanate with amide groups (which is difficult to control), can proceed so far that the polymers which are obtained block conventional injection molding machines, extruders, blowing and foil apparatus, because they can no longer be melted and worked. Therefore, they are wholly unsuitable for present-day thermoplast processing. Owing to their poor meltability and resultant poor flowability, polyamides modified with diisocyanates in accordance with DE-AS-1,224,031 also cannot be used as hot melt adhesives.

Also, in other linking reactions of polyamides with isocyanate-terminated polyurethanes, it is impossible to avoid the cross-linking which immediately ensues, and which leads to similarly unusable products. Thus, the object of the present invention is a process for the preparation of such thermoplastic processable block polymers with amide and urethane segments, which no longer exhibit the disadvantage of comparable products previously known.

DETAILED DESCRIPTION OF THE INVENTION

The present invention comprises a method for the preparation of block polyurethane amides in a melt by the reaction of (a) a linear polyamide having terminal carboxylic acid ester groups and which melts at not more than 210° C.; and (b) a polyurethane having terminal hydroxyl groups;

at a temperature of 160° to 240° C., and in the presence of a transesterification accelerator. In preferred forms of the invention, the polyamide and polyurethane are present in substantially equimolar amounts and the reaction is carried out under reduced pressure. Prior to the condensation, it has been found advantageous to first blend the polyamide and polyurethane to form a homogeneous mixture above their respective melt temperatures. The reaction can be carried out as a batch process, e.g. in an autoclave, or as a continuous process, especially using thin-layer condensation. The number average molecular weight range of the polyamide is from 500 to 12000 g/mol; preferably, 900 to 5,000 g/mol.

The polyamide reactant is prepared from polyamide-forming components and a dicarboxylic acid, together with a mono-functional, primary aliphatic alcohol. Broadly, the components and the dicarboxylic acid are used in an amount sufficient to provide the second terminal carboxylic acid ester group in the polyamide and the alcohol is used in an amount sufficient to esterify the intermediate carboxyl groups. This reaction takes place in the presence of an esterification catalyst.

Appropriate polyamide-forming components are lactams and $\omega$-amino carboxylic acids having 6 to 12 carbon atoms. In particular, caprolactam, laurolactam, dodecanelactam, aminocaproic acid, 11-aminoundecanoic acid, or 12-aminododecanoic acid (12-aminolauric acid), have been found advantageous. These polyamide-forming components may be substituted by equimolar amounts of a dicarboxylic acid having 6 to 13 carbon atoms and a diamine having 6 to 18 carbon atoms. Of course, such components can be used alone or with others.

To introduce the second terminal carboxylic acid ester group into the molecule of the polyamide reactant, dicarboxylic acids having 6 to 36 carbon atoms are used. In particular, adipic acid, terephthalic acid, isophthalic acid, azelaic acid, sebacic acid, dodecanedioic acid, brassidic acid, or dimerised fatty acids have been found particularly desirable.

The preferred aliphatic primary alcohols have 4 to 8 carbon atoms and include n-butanol, n-hexanol, n-octanol, and 2-ethyl-1-hexanol. The esterification catalysts are preferably Sn(II), Sn(IV), and Zr compounds. In particular, Sn(II) oxide, Sn(II) salts of monocarboxylic acids, dibutyltinoxide, n-butyltin acid, and $Zr(OR)_4$, wherein R is alkyl having 1 to 4 carbon atoms, have been found quite suitable. The esterification is preferably conducted under reduced pressure and at temperatures between 160° and 240° C.

The polyamides are prepared by a two-step reaction. First, the polyamide-forming components are reacted with the dicarboxylic acid to introduce the terminal carboxyl groups onto the polyamide base molecule. Thereafter, these groups are esterified by the primary alcohol, in the presence of a suitable esterification catalyst. In order to insure complete esterification, an excess of alcohol is used. This can later be recovered.

The polyurethanes which constitute the other reactant in the present method are generally known. They are prepared in known manner from at least one diisocyanate and a unimolar excess of one or more diols. Advantageously, the addition of diols to the isocyanates can be conducted either directly or in the presence of an inert solvent. Suitable diisocyanates are those wherein the isocyanate groups are bonded to an aromatic, aliphatic, or cycloaliphatic carbon atom. Particularly desirable are those diisocyanates having isocyanate groups bonded to an aliphatic and/or cycloaliphatic carbon; e.g. hexamethylene-1,6-diisocyanate, 2,2,4-trimethylhexamethylene-1,6-diisocyanate, 2,4,4-trimethylhexamethylene-1,6-diisocyanate, decamethylene-1,10-diisocyanate, dodecamethylene-1,12-diisocyanate, 3-isocyanatomethyl-3,5,5-trimethylcyclohexylisocyanate, cis- or trans-cyclohexane-1,4-diisocyanate or bis(4-cyanocyclohexyl)methane.

The diols used in the production of the polyurethanes are preferably those having primary hydroxyl groups; e.g. butane-1,4-diol, hexane-1,6-diol, 2,2,4-trimethylhexane-1,6-diol, 2,4,4-trimethylhexane-1,6-diol, 2,2dimethylpropane-1,3,-diol, decane-1,10-diol, dodecane-1,12-diol, diethylene glycol, triethylene glycol, $\alpha$, $\omega$-dihydroxypolytetramethylene oxides, $\alpha$, $\omega$-dihydroxy polyethylene oxides having a number average molecular weight of 500-4,000 g/mol, cis/trans-1,4-bis-(hydroxymethyl)cyclohexane, 1,4-bis(hydroxymethyl)benzene, 1-4-bis(2-hydroxyethoxy)benzene or 2,2-bis[4-(2-hydroxy-ethoxy)phenyl]propane.

It has been found particularly advantageous to carry out the formation of the block polyurethane amides of the present invention by using the esterification catalyst which was used in the preparation of the polyamide as the accelerator. Other esterification catalysts may be used, either alone or in combination with the catalyst used in producing the polyamide reactant.

The method of the present invention can be carried out as a batch or continuous process. In the former case, an autoclave provided with a stirrer, a vacuum pump, and a delivery unit are advantageously used. There is considerable advantage in preparing these polymers in a continuous process. In particular, the residence time of the polymers in the reactor should be maintained relatively constant. This time is substantially shorter than in the batch procedure. Moreover, undesired side reactions during the polycondensation are more easily repressed and controlled in the continuous process than on a batchwise basis.

For best results in the continuous polycondensation, reactors which are designed to operate in accordance with thin layer condensations are desirable. Such reactors are shown in Swiss patent No. 492477 and U.S. Pat. No. 4,208,493.

The block polymers of the present invention are surprisingly useful for the preparation of injection-molded or extruded parts, as well as hot melt adhesives. Their thermoplastic processability permits other procedures; e.g., covering metal surfaces with a thin polymer layer, by means of a sintering process. The structure and properties of these polymers can be modified as desired for the particular uses intended. Normally, this is done by a suitable choice of the two reactants.

Examples 1, 2, and 3 illustrate the preparation of the reactants, while Examples 4 and 5 demonstrate the preparation of the polymer of the present invention. In all cases, the solution viscosities were measured as a 0.5% by weight solution of the block polymer in m-cresol at 25° C. in accordance with DIN 53 727. Measurement of the melting and setting points was carried out on a DSC apparatus, type 990 from Du Pont. In each case, the maxima of the melt peaks are given as the melting point. The solidification or setting temperatures were determined in an analogous manner.

EXAMPLE 1

430.7 g (2 mol) $\omega$-aminolauric acid, 61.4 g (0.266 mol) decane-1, 10-dicarboxylic acid and 1 g Irganox 1330 (antioxidant from Ciba-Geigy AG) were introduced into a 1-liter 4-neck flask having stirrer, internal thermometer, distillation bridge with receiver and $N_2$ inlet. The components were melted under nitrogen at 190° C. within one hour, whereby polycondensation ensued with the release of 18 ml water. Stirring and nitrogen introduction were continued for a further 2 hours with heating to 240° C., followed by one hour at this temperature under a vacuum of 10 torr. 12 ml more water of reaction were thus distilled off. To 456 g of the melt of the thus-prepared carboxyl group-terminated Polyamide 12, whose number average molecular weight is 1710 g/mol, after the addition of 1 g tin (II) dibenzoate (esterification catalyst), 188 g (230 ml; 3.5-fold excess) n-hexanol were added dropwise over 3 hours at 230° C. melt temperature under $N_2$. The water formed during the course of the esterification was thus distilled off together with excess n-hexanol. In order to complete the reaction, the melt was stirred for 10 minutes more at 230° C. under a vacuum of 1 torr. The melt was then poured into a flat, Teflon foil-covered aluminum trough and left there to cool and crystallize.

This carboxylic acid n-hexyl ester group-terminated Polyamide 12 (Ia) had a number average molecular weight of 1878 g/mol, a DSC-melting point of 162° C., a solidification point of 146° C., and a relative viscosity of 1.101. On titration of its carboxyl terminal groups, a value of 7 $\mu$mol COOH/g was determined corresponding to 99.35% esterification reaction.

EXAMPLE 2

78 g (0.66 mol) hexane-1,6-diol were melted together with 0.04 ml benzoyl chloride in a 500 ml 4-neck flask having a dropping funnel, stirrer, internal thermometer and reflux condenser with $CaCl_2$ tube, and heated to 100° C. This mixture was stirred at 100° C. for 45 minutes during which time 92.5 g (0.44 mol) trimethylhexamethylene diisocyanate (an isomeric mixture of 2,2,4- and 2,4,4-trimethylhexamethylenediisocyanates; producer: Chemische Werke Huels AG, Marl) were added dropwise. Stirring was then continued for 4 hours at 120° C. The resultant polyurethane diol (IIa) was stored in a closed vessel until its further use. In the product (IIa), it is no longer possible to detect free isocyanate groups by conventional techniques. Its number average molecular weight was 775 g/mol.

EXAMPLE 3

Under the same reaction conditions as for the polyurethane diol (IIa), a diol mixture of 87.3 g (0.605 mol) 1,4-hydroxymethyl)cyclohexane (cis- and transisomers) and 55 g (0.055 mol) $\alpha$, $\omega$-dihydroxypolytetramethylene oxide (tetrathane 1000 from Du Pont; number average molecular weight 1000 g/mol) were reacted with 92.5 g (0.44 mol) trimethylhexamethylene diisocyanate (see the procedure for IIa) to give the corresponding polyurethane diol (IIb).

The reactant (IIb) once again contained no isocyanate groups. The number of average molecular weight of (IIb) was 1067 g/mol.

EXAMPLE 4

131.5 g (0.07 mol) of reactant (Ia), 54.25 g (0.07 mol) of the polyurethane diol (IIa) and 0.4 g tin (II) dioctanoate (Metatin Kat. S26 from the company ACIMA AG, Buchs) as trans-esterification catalyst were introduced into a 500 ml 4-neck flask with stirrer, internal thermometer, nitrogen inlet, distillation bridge with condenser and vacuum connection. The reactants were melted by heating to 180° C. over 30 minutes, and mixed together by concurrent stirring. Once a clear melt was obtained, a vacuum of 0.7 torr was applied to the apparatus. The melt temperature was then adjusted to 210° C. over 20 min and to 220° C. over a further 15 min. It could be seen that the viscosity of the melt increased as a result. The polycondensation was ended 5 min after reaching 220° C. The clear melt of the resultant block polyurethane-amide was poured into cold water and thus solidified.

The polymer had a DSC melting point of 158° C. and a relative viscosity of 1.467.

During the preparation of this block polyurethaneamide, 9.85 g n-hexan-1-ol (n-hexanol) and 0.4 g hexane-1,6-diol were distilled off, as was apparent from the gas-chromatographic analysis of the distillate. The given amount of the n-hexanol distilled off corresponded to 68.5% trans-esterification reaction.

EXAMPLE 5

In the same manner as in Example 4, 131.5 g (0.07 mol) of the component (Ia) and 74.7 g (0.07 mol) of the polyurethane diol (IIb) were subjected to polycondensation in the presence of 0.4 g tin (II) dioctanoate. A block polyurethane-amide was thus obtained, which melted at 157° C. and had a relative viscosity of 1.477. This polymer is more flexible than that of Example 1.

The amount (10.35 g) of n-hexanol distilled off during the preparation of the block polyurethane-amide gave a change of 72% for the trans-esterification. In addition to the n-hexanol, 0.4 g hexane-1,6-diol was also recovered in the distillate.

While only a limited number of specific embodiments of the present invention have been expressly disclosed, nonetheless, it is to be broadly construed and not to be limited except by the character of the claims appended hereto.

What we claim is:

1. A method for the preparation of block polyurethane amides in a melt by the reaction of
   (a) a linear polyamide having terminal carboxylic acid ester groups and which melts at not more than 210° C.; and
   (b) a polyurethane having hydroxyl groups at its chain ends;
at a temperature of 160° C. to 240° C., and in the presence of a trans-esterification accelerator.

2. The method of claim 1 wherein said polyamide and said polyurethane are in substantially equimolar amounts.

3. The method of claim 2 wherein said polyamide and said polyurethane are first blended homogeneously above their melt temperatures, and then polycondensed by transesterification.

4. The method of claim 1 wherein said accelerator is a catalyst used in preparation of said polyamide.

5. The method of claim 1 wherein said reaction is batchwise and takes place in an autoclave.

6. The method of claim 1 wherein said reaction takes place under reduced pressure.

7. The method of claim 1 wherein said reaction is a continuous, thin-layer condensation.

8. The method of claim 1 wherein said polyamide has a number average molecular weight of from 500 to 12,000 g/mol. determined by end group analysis.

9. The method of claim 8 wherein said molecular weight is 900 to 5,000 g/mol.

10. The method of claim 1 wherein said polyamide is the reaction product of a polyamide-forming component and a dicarboxylic acid, esterified by a primary aliphatic alcohol.

11. The method of claim 10 wherein said component is taken from the class consisting of (a) lactams and ω-aminocarboxylic acids having 6 to 12 carbon atoms, and (b) equimolar amounts of a dicarboxylic acid having 6 to 13 carbon atoms and a diamine having 6 to 18 carbon atoms.

12. The method of claim 10 wherein said component is caprolactam, laurolactam, dodecanelactam, aminocaproic acid, 11-aminoundecanoic acid, or 12-aminododecanoic acid.

13. The method of claim 10 wherein said dicarboxylic acid has 6 to 36 carbon atoms.

14. The method of claim 13 wherein said dicarboxylic acid is adipic acid, terephthalic acid, isophthalic acid, azelaic acid, sebacic acid, dodecanedioic acid, brassidic acid, or dimerized fatty acids.

15. The method of claim 10 wherein said primary alcohol has 4 to 8 carbon atoms.

16. The method of claim 15 wherein said primary alcohol is n-butanol, n-hexanol, n-octanol, or 2-ethyl-1-hexanol.

17. The method of claim 1 wherein said accelerator is Sn(II), Sn(IV), or Zr compounds.

18. The method of claim 17 wherein said accelerator is Sn(II) oxide, Sn(II) salts of monocarboxylic acids, dibutyltin oxide, n-butyltin acid, or $Zr(OR)_4$, wherein R is alkyl having 1 to 4 carbon atoms.

19. The method of claim 1 wherein said polyurethane is the reaction product of at least one diisocyanate and at least one diol.

20. The method of claim 19 wherein said diisocyanate has its isocyanate groups bonded to an aliphatic, aromatic, or cycloaliphatic carbon atom.

21. The method of claim 20 wherein said diisocyanate is hexamethylene-1,6-diisocyanate; 2,2,4-trimethylhexamethylene-1,6-diisocyanate; 2,4,4-trimethylhexamethylene-1,6-diisocyanate; decamethylene-1,10-diisocyanate; dodecamethylene-1,12-diisocyanate; 3-isocyanatomethyl-3,5,5-trimethylcyclohexyl isocyanate; cis-or trans-cyclohexane-1,4-diisocyanate; or bis(4-cyanocylohexyl)methane.

22. The method of claim 19 wherein said diol is aliphatic, cycloaliphatic, or aromatic and carries a primary hydroxyl group.

23. The method of claim 22 wherein said diol is butane-1,4-diol; hexane-1,6-diol; 2,2,4-trimethylhexane-1,6-diol; 2,4,4-trimethylhexane-1,6,diol; 2,2 dimethylpropane-1,3-diol; decane-1,10-diol; dodecane-1,12-diol; diethylene glycol; triethylene glycol; α, ω-dihydroxypolytetramethylene oxide; α, ω-dihydroxypolyethylene oxide having a number average molecular weight of 500 to 4,000 g/mol; cis/trans-1,4-bis(hydroxymethyl)cyclohexane; 1,4-bis(hydroxymethyl)benzene; 1,4-bis(2-hydroxyethoxy) benzene; or 2,2-bis[4-(2-hydroxyethoxy)phenyl] propane.

24. The method of claim 22 wherein the mol ratio of said diol to said diisocyanate is n to n+1, n being from 1 to 15.

25. A block polyurethane amide which is the reaction product of the method of claim 1.

26. An injection molded or extruded shape of the amide of claim 25.

27. The method of claim 10 wherein said component is a dicarboxylic acid having 6 to 36 carbon atoms combined with a diamine having 6 to 36 carbon atoms.

* * * * *